US006895011B1

(12) United States Patent
Lassers

(10) Patent No.: US 6,895,011 B1
(45) Date of Patent: May 17, 2005

(54) METHOD AND APPARATUS FOR RE-SEQUENCING DATA PACKETS

(75) Inventor: Harold Aaron Lassers, DuPage County, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 825 days.

(21) Appl. No.: 09/638,362

(22) Filed: Aug. 15, 2000

(51) Int. Cl.$^7$ ............................................... H04L 12/56
(52) U.S. Cl. ...................................... 370/394; 370/525
(58) Field of Search ................................ 370/394, 389, 370/392, 416, 418, 419, 428, 471, 525, 526, 401, 410, 411, 412, 465, 468, 474, 522; 379/88.12, 372, 373.01, 373.02, 374.02, 375.01

(56) References Cited

U.S. PATENT DOCUMENTS

| | | | | |
|---|---|---|---|---|
| 4,979,171 A | * | 12/1990 | Ashley | 370/525 |
| 5,337,313 A | | 8/1994 | Buchholz et al. | 370/394 |
| 5,339,311 A | * | 8/1994 | Turner | 370/394 |
| 5,384,807 A | * | 1/1995 | Yatim et al. | 375/244 |
| 5,461,614 A | | 10/1995 | Lindholm | 370/394 |
| 5,648,970 A | * | 7/1997 | Kapoor | 370/394 |
| 5,864,762 A | | 1/1999 | Childress et al. | 455/509 |
| 6,487,213 B1 | * | 11/2002 | Chao | 370/418 |
| 6,493,342 B1 | * | 12/2002 | Breslow et al. | 370/394 |
| 6,636,896 B1 | * | 10/2003 | Philyaw | 709/238 |
| 6,640,248 B1 | * | 10/2003 | Jorgensen | 709/226 |

OTHER PUBLICATIONS

European Search Report, Application No. EP 01 30 2267, dated Nov. 22, 2001, Examiner Bosch, M, place of search, Munich.

* cited by examiner

*Primary Examiner*—Brian Nguyen
(74) *Attorney, Agent, or Firm*—John B. MacIntyre

(57) ABSTRACT

The present invention provides a method and apparatus for re-sequencing data packets received from multiple devices in a packet-based digital communication system. A set of data packets is received by a data packet sequencer. Each data packet includes an indicator of the originator of the data packet. The data packet sequencer stores the set of data packets, preferably in an input buffer. The data packet sequencer reorders the data packets by retrieving a first data packet and determining the originator of the first data packet. The data packet sequencer then transmits all data packets that were originated by a first originator of the first data packet prior to transmitting data packets that were not originated by the first originator.

19 Claims, 4 Drawing Sheets

700

METHOD AND APPARATUS FOR RE-SEQUENCING DATA PACKETS

FIELD OF THE INVENTION

The present invention relates generally to digital communication systems, and more particularly to a method and apparatus for re-sequencing data packets in a packet-based digital communication system.

BACKGROUND OF THE INVENTION

Typical cellular communications are user-to-user calls. In these cellular calls, a first cellular user dials the directory number of a second user, who can be a cellular user or a landline user. Assuming the second user answers the call, a full-duplex communication takes place, where both the first user and the second user can send and receive voice signals to the other user. These voice signals can be sent and received simultaneously.

Dispatch systems are typically one-to-many communications. A dispatch call is typically initiated by a dispatcher who initiates a dispatch call to a group of users of the system. For example, a dispatcher for a taxi company may send out a dispatch request to all taxicab drivers asking for any driver available to pick up a patron at a particular address. The communication in a dispatch call is typically simplex or half-duplex, where the voice data travels in a single direction, typically from the dispatcher to the group of users.

One problem inherent in all dispatch systems occurs when multiple users respond to a dispatch message. In such scenarios, multiple users often respond simultaneously. In the example given above, multiple taxicab drivers may respond that they are willing and able to pick up the customer at the stated address. In such situations, the response from the multiple users is typically combined, which leads to the recipient of the multiple responses being unable to decipher them. Often, the dispatcher must send a second message requesting the users to resend their responses. The dispatcher may have to specifically state which user should respond first. This leads to a very inefficient utilization of resources.

In packet-based communication systems, the responses sent by the recipients of the original dispatch message are often interleaved. Interleaving refers to the process of arranging the order of packets from multiple users to form a data stream in which packets from one user are not contiguous. Although interleaving is effective in reducing the probability that a data error will disproportionately affect one user's communication, it can have other undesirable characteristics.

One problem that occurs in dispatch calls in packet-based communication systems is that the voice packets of replying users are mixed together. The mingled voice packets, when played, thereby often do not form an intelligible voice pattern, but rather an unintelligible mixture of the multiple respondents.

Therefore, a need exists for a method and apparatus for effectively sequencing data packets in a manner that is intelligible by the recipient of the data packets.

SUMMARY OF THE INVENTION

It is an object of the present invention to provide a method and apparatus for re-sequencing data packets in a packet-based communication system. The present invention is especially useful for dispatch calls placed in packet-based communication systems, but is not limited to only this application.

The preferred embodiment of the present invention provides a method and apparatus that re-sequences data packets that have been received from multiple responses in response to a dispatch request. In typical dispatch calls, a dispatch request is sent from a dispatcher. A dispatch call is a one-to-many communication, where the dispatch request goes to multiple users who are in a dispatch group.

A dispatch response is a communication from one of the users in the dispatch group in response to the dispatch request. Dispatch responses preferably are sent to all members of the dispatch group, but can alternately be sent to the originator of the dispatch request, such as the dispatcher.

One problem with dispatch systems is that multiple users may issue dispatch responses substantially concurrently. In typical dispatch communication systems, these responses are transmitted concurrently, and the voices are added together such that the response is often unintelligible.

Utilizing the present invention, however, the received data packets from users may be stored at a data packet sequencer. The data packet sequencer reorders the data packets based upon the originator of the dispatch response. The data packet sequencer then outputs the re-sequenced data packets. In this manner, the data packets from the units responding to the dispatch call are transmitted and played in order based upon the originator and the time of the response. This allows the speech to be intelligible.

In addition, by having the capability to store the data packets, the present invention provides for the ultimate transmission of all dispatch response data packets. The data packets are re-sequenced, but storage of the data packets provides for enhanced reliability by storing the dispatch response packets so that no data packets are lost. In this manner, the data packets will be transmitted by the data packet sequencer.

Thus, the present invention provides a method and apparatus that re-sequences data packets in a packet-based communication system, thereby improving the functionality of dispatch calls in such systems.

DESCRIPTION OF THE PREFERRED EMBODIMENT(S)

Figure 1:
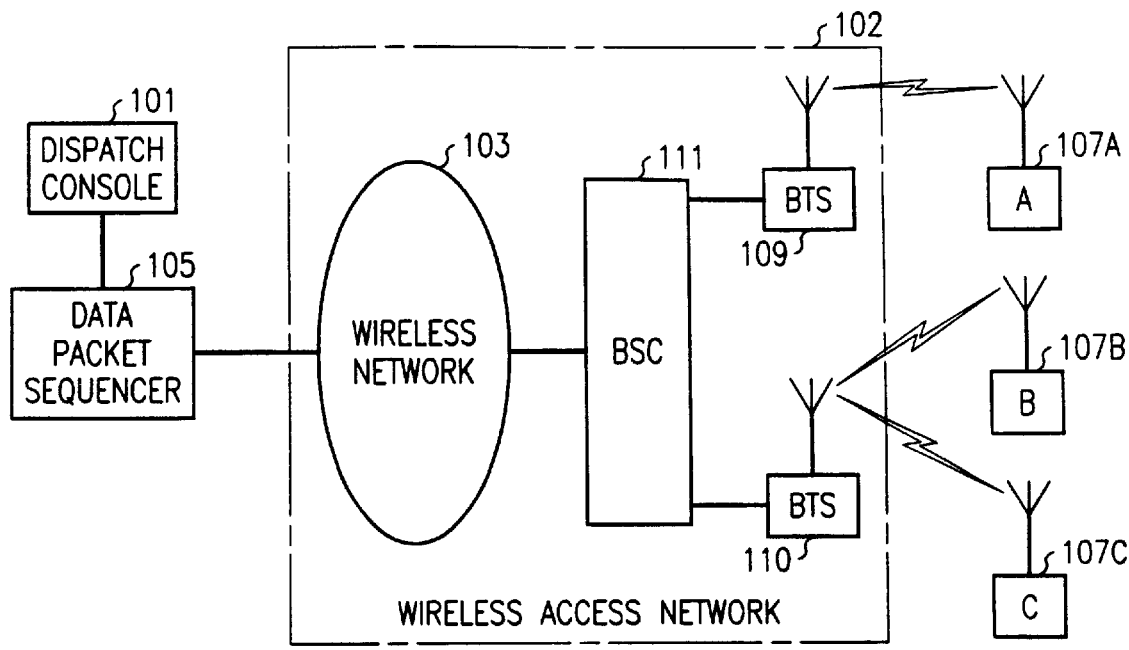
FIG. 1 depicts a packet-based digital communication system including a packet data sequencer in accordance with the preferred embodiment of the present invention.

FIG. 1 depicts a packet-based digital communication system 100 including a dispatch console 101, a wireless packet data network 103, and a data packet sequencer 105 in accordance with the preferred embodiment of the present invention. Communication system 100 is preferably a Code Division Multiple Access (CDMA) system, but could alternately be a Time Division Multiple Access (TDMA) system, a Global System for Mobile Communications (GSM) system, or any packet-based communication system. Utilizing the present invention, communication system 100 is effective in performing a voice dispatch call. A plurality of mobile units 107A, 107B, and 107C are depicted and are in communication with Base Transceiver Stations (BTSS) 109 and 110.

Wireless access network 102 includes wireless network 103, base transceiver stations 109 and 110, and Base Station Controller (BSC) 111. Base transceiver stations 109 and 110 are preferably coupled to and controlled by a base station controller (BSC) 111. BSC 111 can be a Signal Distribution Unit (SDU) or the like. BSC 111 is preferably coupled to an MSC Circuit Switch and a Data Interworking function. The Data Interworking Function is preferably coupled to an IP router.

Wireless access network 102 can be an internet or an intranet utilizing the Internet Protocol (IP). Wireless access network 102 can be coupled to other packet data networks, not shown, or other wireless access networks.

Wireless access network 102 is effective in communicating with mobile units 107A–107C. Wireless access network 102 is effective in receiving a dispatch request from an originating mobile unit and a data packet from the originating mobile unit. Upon receiving the dispatch request, wireless access network 102 transmits the dispatch request and the data packet to packet data network 103. BTSs 109–111 communicate with mobile units 107A–107C utilizing known RF techniques.

Packet data sequencer 105 is depicted in greater detail in FIG. 2 below.

Figure 2:
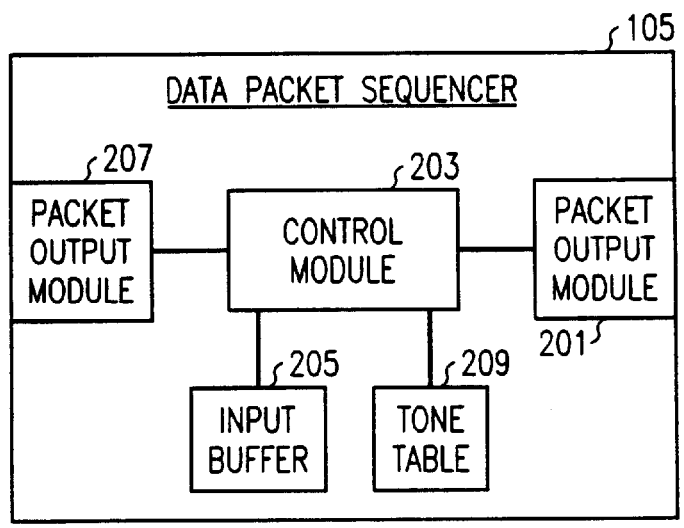
FIG. 2 depicts the data packet sequencer shown in FIG. 1 in more detail in accordance with the preferred embodiment of the present invention.

FIG. 2 depicts data packet sequencer 105 in accordance with the preferred embodiment of the present invention. Packet data sequencer 105 preferably includes a packet input module 201, a control module 203, an input buffer 205, a packet output module 207, and a tone table 209. Input module 201 and packet output module 207 can physically be located in the same device.

Packet input module 201 is effective in coupling to wireless access network 102. Packet input module 201 is effective in receiving a set of data packets 300 depicted in more detail below in FIG. 3. Data packet sequencer 105 stores data packets that are not being immediately transmitted in input buffer 205. The dispatch request is preferably transmitted from dispatch console.101 to data packet sequencer 105, which routes the message through wireless network 103. Wireless network 103 forwards the message to BSC 111, which in turn sends the message to the appropriate BTSs.

The dispatch request can alternately originate from one of the wireless units 107A–107C. In such a scenario, the request is sent over the air from a mobile unit to a BTS, which in turn sends the request to BSC 111, which sends a message to wireless network 101, which sends a message to dispatch console 101 through data packet sequencer 105.

Control module 203 is effective in identifying an originator of each data packet in a data packet stream. Control module 203 is also effective in determining whether an output session is in progress. As used herein, the term "output session" refers to a current active process of transmitting a data packet from a set of data packets. If an output session is not in progress, control module 203 establishes an output session if there are stored data packets in input buffer 205.

Packet output module 207 is preferably coupled to dispatch console 101 and is effective in sending all data packets that were sent by the originator.

Tone table 209 comprises a plurality of representations of audible tones. The representations of tones included in tone table 209 are preferably correlated to a particular mobile unit. For example, each mobile unit when registering with the system is assigned a unique tone, and a representation of this unique tone is stored in tone table 209 along with the user identification of the mobile unit. The tones are played before the first packet being output by packet data sequencer 105. The tones indicate to users of the dispatch group that packets from a different user are about to be transmitted. In this manner, the tones alert the dispatch members of a communication from a new user.

In the preferred embodiment of the present invention, control module 203 checks tone table 209 to determine whether the originating mobile unit has an associated tone. If control module 203 determines that the originating mobile unit has an associated tone, control module 203 uses the associated tone. If control module 203 determines that the originating mobile unit does not have an associated tone, control module 203 associates a default tone with the originating mobile unit. In the preferred embodiment, a plurality of default tones are stored in tone table 209. Control module 203 preferably inserts the associated tone or default tone to the first output packet associated with a dispatch group member.

Figure 3:
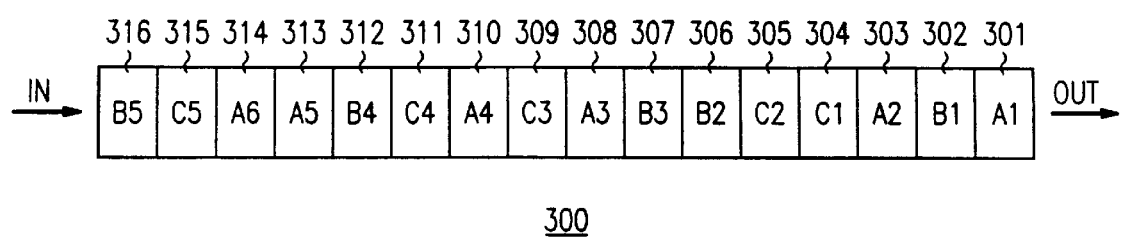
FIG. 3 depicts a set of data packets received from multiple devices in accordance with the preferred embodiment of the present invention.

FIG. 3 depicts a set of data packets 300 received from multiple originators in accordance with the preferred embodiment of the present invention. In the embodiment depicted in FIG. 3, data packets 300 include data packets 301–316. Data packets 301–316 have been received from three wireless devices, wireless device 107A, wireless device 107B, and wireless device 107C. In the preferred embodiment of the present invention, each data packet includes a packet header, and the control module is effective in identifying the originator of the packet by the packet header.

Data packets 301–316 depict the wireless device that each data packet has been received from, as well as the order in which the data packets were received. For example, in the set of data packets 300 depicted in FIG. 3, packet 301 stores the first packet received, which was the first packet received from wireless device 107A, as depicted by symbol A1. The second packet received was received from wireless device 107B, and is depicted as B1 in packet 302. Set of data packets 300 continues until the sixteenth packet received, packet 316, which corresponds to the fifth packet received from mobile unit 107B. This packet was received after packets 301–315.

Set of data packets 300 are preferably initially ordered in the order in which they were received. Consequently, as depicted in FIG. 3, the first packet received, A1, is stored in packet memory 301. The second packet received, BA, is stored in packet memory 302. As can be seen, data packets according to this example have been received from multiple sources at approximately the same time, such that the data packets are interleaved. If the packets are output in the order in which they were received, any device that receives these interleaved packets will have difficulty in making sense of the transmissions.

Figure 4:
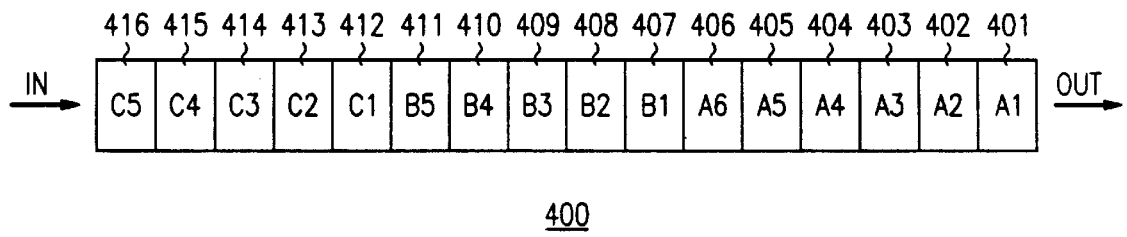
FIG. 4 depicts the set of data packets of FIG. 3 subsequent to being reordered by the packet data sequencer in accordance with the preferred embodiment of the present invention.

FIG. 4 depicts the set of data packets of FIG. 3 subsequent to being reordered by the packet data sequencer in accordance with the preferred embodiment of the present invention. In the preferred embodiment of the present invention, the data packet sequencer has reordered the packets such that all packets received from wireless device 107A will be transmitted prior to those sent by any other user. In the preferred embodiment as shown in FIG. 4, after sending all packets received from wireless device 107A, all packets sent from wireless device 107B will be sent prior to sending those from wireless device 107C.

In this manner, the data packets from each wireless device are re-sequenced in such a way that they are received in chronological order, but resequenced such that they are organized in chronological order by originator. Therefore, the mobile unit that sends the first received packet will have all packets sent from that mobile unit placed first in the output queue, followed by all packets originated by the second received mobile unit, and so forth. In this manner, the packets, are reorganized according to originator such that when processed in the reordered manner, the speech is intelligible.

Figure 5:
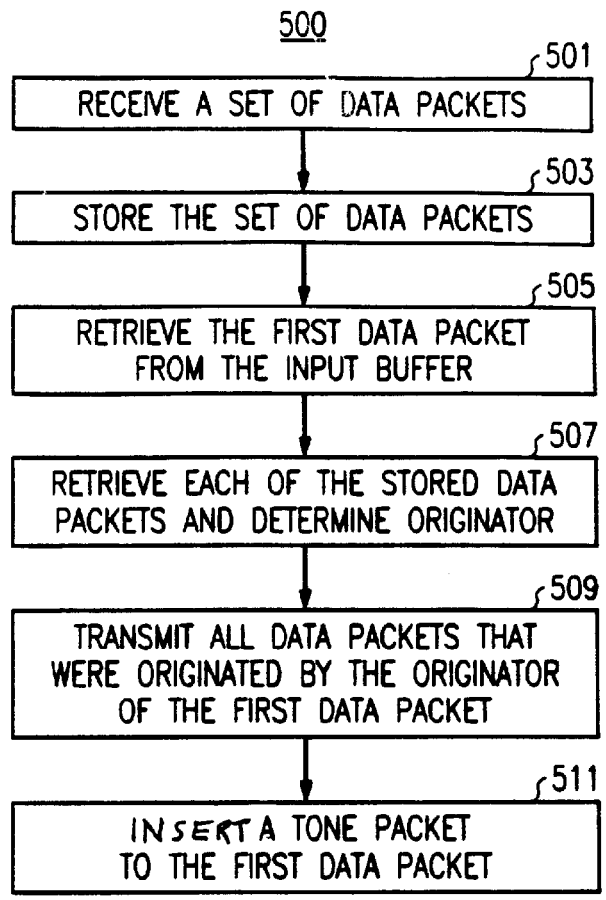
FIG. 5 depicts a flowchart of a method for re-sequencing a set of data packets received from multiple devices in accordance with the preferred embodiment of the present invention.

FIG. 5 depicts a flowchart 500 of a method for re-sequencing data received from multiple devices in accordance with the preferred embodiment of the present invention. In the preferred embodiment, data packets are received from multiple devices. In an alternate embodiment of the present invention, multiple data packets can be received from the same device. In this embodiment, the data packets can be categorized into sessions, wherein each session refers to a communication that is related, and wherein different sessions typically refer to different communications.

In accordance with the preferred embodiment of the present invention, a data packet sequencer receives (501) a set of data packets, such as those depicted in FIG. 3. Each data packet preferably includes an indicator of the originator of the data packet. In the preferred embodiment, the data packets are streaming, meaning that they continue to arrive at the data packet sequencer and do not arrive in batch.

The packet data sequencer stores (503) the set of data packets, preferably at an input buffer located within the packet data sequencer. In the preferred embodiment, the data packet sequencer only stores the packets for as long as is necessary to transmit them in the desired order. Some packets will be temporarily stored and then transmitted, almost immediately. For example, the first packet received by the data packet sequencer will be transmitted very quickly by the data packet sequencer, along with other packets from the originator of the first packet. Any packets received by the data packet sequencer while transmitting packets from the first originator will be buffered for longer periods of time. The packet data sequencer preferably transmits an indication to the mobile units in the dispatch group that data packets are being stored at the data packet sequencer. This can be accomplished by sending a message to the mobile unit that instructs the mobile unit to alert the user that data packets are being stored, such as by turning on an indicator light on the mobile unit.

When ready to transmit, the packet data sequencer retrieves (505) a first data packet from the input buffer. The first data packet retrieved is preferably the first data packet that arrived at the packet data sequencer for this dispatch call. The packet data sequencer determines the indicator of the originator of the first data packet from the first data packet.

The packet data sequencer then retrieves (507) each of the stored data packets and determines the originator of each of the stored data packets. The packet data sequencer preferably makes a plurality of linked lists, one for each originator. The first element in each linked list is preferably a tone for that user. As discussed above, the tone can either be a tone associated with the user or a default tone. The next element in the list is the first packet received from that originator. A link then exists to the next packet originated by this user, and this linked list continues until the list is linked to the last packet received from this user. At this point, the link list can point to a null record, a default end of record, or any other element that indicates that the last packet sent from a user has been reached.

The packet data sequencer determines whether a packet is the last packet originated by the originator by detecting an end of transmission packet within the plurality of data packets.

If it is determined that this is the first packet associated with the sender, the packet data sequencer preferably starts a timer. Upon expiration of the timer, the packet data sequencer determines a second originator, as described below. The'steps in sending the packets of the second originator include retrieving the next packet, determining the second originator, and sending all data packets originated by the second originator.

The packet data sequencer then transmits (509) all data packets that were originated by the originator of the first data packet. This is preferably done prior to transmitting data packets that were not originated by the originator.

This process then preferably continues for each originator. For example, the packet data sequencer determines the indicator of a second originator distinct from the originator of the first data packet and transmits all data packets that were originated by the second originator. After all packets originated by the it second user are transmitted, the packet data sequencer transmits all packets originated by a third user. This process continues until all received data packets have been transmitted.

The packet data sequencer preferably inserts (511) a tone prior to the first data packet. The tone is preferably correlated to a particular user and retrieved from a tone table. In the alternate embodiment, the user does not have a corresponding tone, and the packet data sequencer appends a default tone to the first data packet. The tone is utilized to indicate that the transmissions from the data packet sequencer are now from a different user than the previous transmissions. This cues the dispatcher and other members of the dispatch group that a different respondent is speaking.

In this manner, a plurality of packets that have been received from multiple sources are reordered prior to transmission. This allows the recipient of the packets, such as the dispatcher who originated the dispatch call, to receive the packets in an order that makes processing, such as listening, much more intelligible. The present invention thereby facilitates enhanced communication, particularly in a packet-based communication system that includes dispatch capability.

Figure 6:
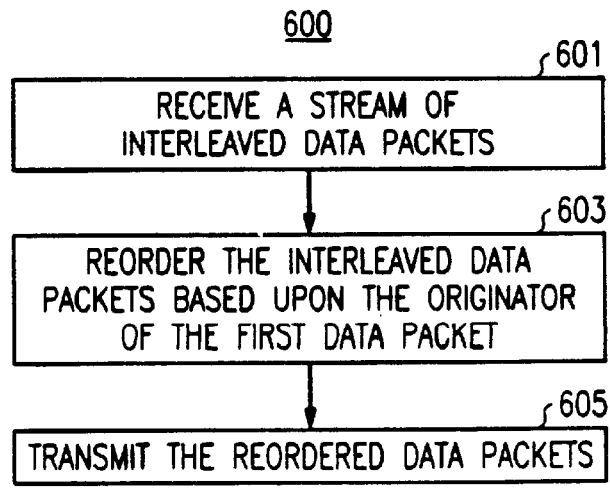
FIG. 6 depicts a flowchart of a method for re-sequencing a set of data packets in a packet-based digital communication system in accordance with a preferred embodiment of the present invention.

FIG. 6 depicts a flowchart 600 of a method for re-sequencing data packets in a packet-based digital communication system in accordance with a preferred embodiment of the present invention.

The packet data sequencer receives (601) a stream of interleaved data packets. The stream of interleaved data packets each include an indicator of the originator of In the data packet.

The data packet sequencer then reorders (603) the interleaved data packets based upon the indicator of the originator of the data packet to form reordered data packets. In this manner, the data packet sequencer produces a data packet stream that has been reordered based upon the originator of the packet. The reordered stream is preferably arranged in chronological order, so that the packets are stored in a first in, first out sequence based upon the originator of the packet. This sequence facilitates enhanced voice communications by ensuring that the packets are in order based upon the time of arrival.

In the preferred embodiment of the present invention, the packet data sequencer transmits (605) the reordered data packets. The packet data sequencer also preferably determines whether an output session is in progress. If not, the packet data sequencer preferably establishes an output session.

Figure 7:
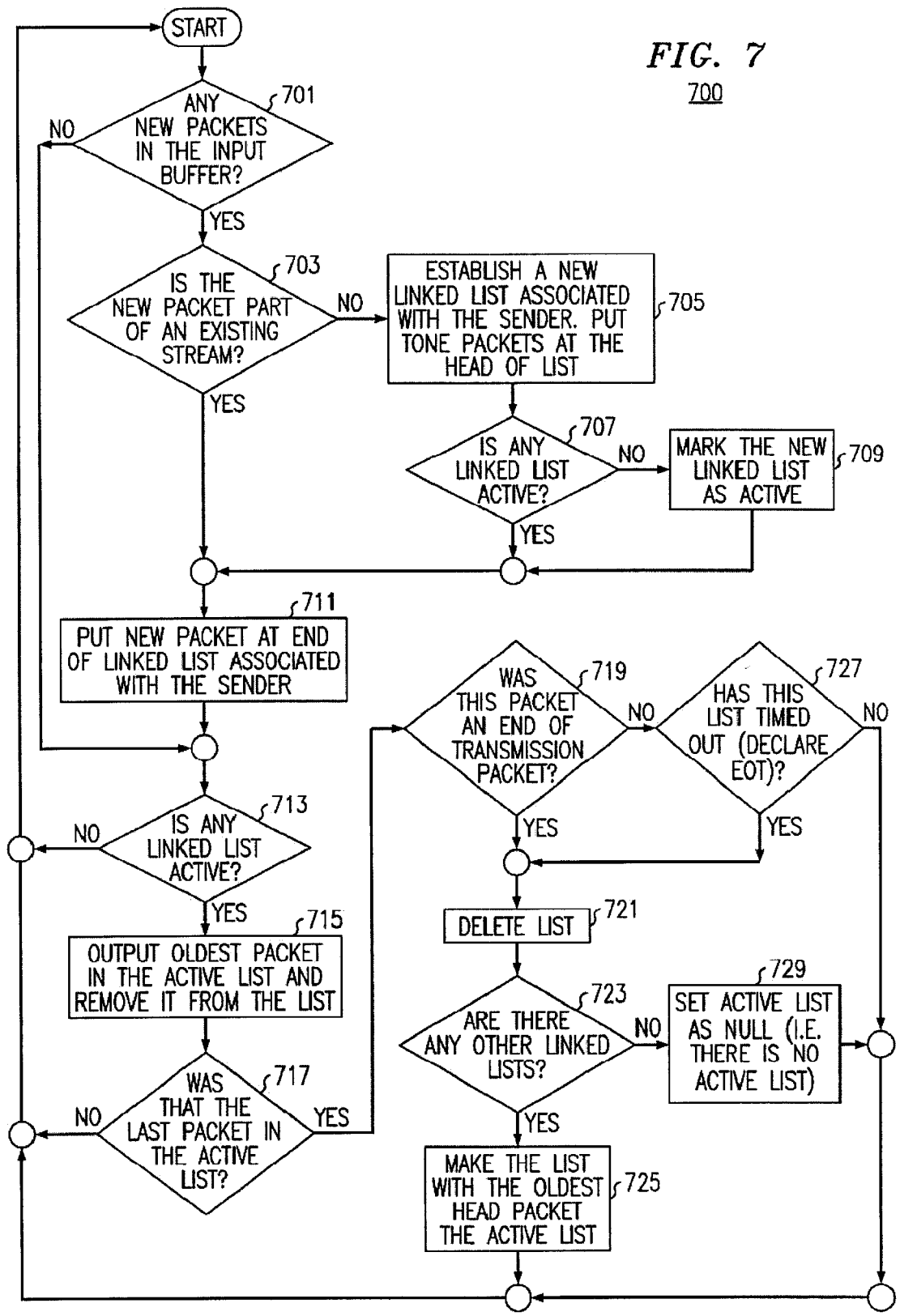
FIG. 7 depicts a detailed flowchart of the preferred method of re-sequencing data packets received from multiple devices.

FIG. 7 depicts a detailed flowchart 700 of the preferred method for re-sequencing a set of data packets received from multiple devices. Flowchart 700 is preferably accomplished by packet data sequencer 105.

The packet data sequencer determines (701) whether there are any new data packets in the input buffer. If there are no new packets in the input buffer; processing proceeds to step 713 described below.

If there are new packets in the input buffer, the packet data sequencer determines (703) whether the new packet in the input buffer is part of an existing stream. This is preferably accomplished by extracting the originator of the packet from the header of the packet and comparing the originator with the originators of the existing streams. If the new packet is not part of an existing stream of data, the packet data sequencer establishes (705) a new linked list associated with the sender of the packet. The packet data sequencer preferably places a tone at the head of the new linked list. The tone acts an indicator of a new linked list. The packet data sequencer then determines (707) whether any linked list is active. If no linked list is active, the new linked list is marked (709) as the active linked list.

If decision box 703 returns yes, or decision box 707 returns yes, or following step 709, the packet data sequencer puts (711) a new packet at the end of the linked list associated with the sender.

The packet data sequencer then determines (713) whether any linked list is active. If no linked list is active, the processing returns to step 701 to determine if there are any new packets in the input buffer. If there is an active linked list, the packet data sequencer outputs (715) the oldest packet in the active list. The packet data sequencer preferably removes the output packet from the list after outputting the packet.

The packet data sequencer then determines (717) whether the output packet was the last packet in the active list. If not, the processing returns to step 701. If this was the last packet in the active list, processing will continue to determine if other linked lists should be transmitted.

The packet data sequencer determines (719) if the output packet was an end of transmission packet. If not, the packet data sequencer determines (727) whether the list has timed out. This is preferably accomplished by detecting the expiration of a timer. If the list has not timed out, the processing returns to step 701 to determine if there are any new packets in the input buffer.

If the packet was an end of transmission packet or the list has timed out, the list will be deleted (721). The packet data sequencer then determines (723) whether there are any other linked lists. If there are no other linked lists, the packet data sequencer sets (729) the active list as NULL, which indicates that there is no active list. If there are other linked lists, the packet data sequencer makes (725) the linked list with the oldest header packet the active lists. Processing then returns to step 701 to determine if there are any new packets in the input buffer.

Thus, the present invention provides a method and apparatus that solves a problem associated with the prior art. By resequencing a set of data packets received from multiple originators, the responses can be intelligibly heard by the dispatcher or other member of the dispatch group. By storing and reordering the data packets at a data packet-sequencer, increased reliability is achieved by storing a copy of the data packet. The present invention also minimizes the utilization of system resources by minimizing the number of retransmissions required in dispatch systems to get an intelligible response form a respondent to a dispatch request.

Although the preferred embodiment of the present invention has been described in terms of having the data packets come from multiple devices, it should be understood that the present invention is not limited to receiving data packets from multiple devices. The data packets can come from a single device that has transmitted the packets in different sessions. For example, the data packets can be originated by a single wireless unit, but can come from two separate responses. In this case, the data packet sequencer would order the data packets by a session identifier rather than by an originator. In terms of the present invention, the session itself would be considered the originator, and all data packets sent during one session would be considered to have been sent by an originator. In accordance with the present invention, these packets would be reordered such that they would be transmitted together.

The re-sequencing of the data packets based upon the indicator of the originator of the data packet also provides for enhanced voice communication in any situation where a server or the like receives multiple packet responses from multiple devices, or multiple responses from the same devices that are distinct from each other. One example of the benefits of the present invention is in a packet-based dispatch system.

In a packet-based dispatch system, a dispatch server establishes a dispatch group. The dispatch group preferably comprises a plurality of mobile units that register with the dispatch server, preferably on power up of the mobile unit. The dispatch group can also include fixed communication units, such as landline telephones and fixed terminals, such as dispatch terminals.

In such a packet-based dispatch system, if a dispatch call is sent, by a dispatcher or the like, many devices may respond. These responses often happen contemporaneously, such that if the packets are not reordered based upon the originator of the response, the packets will be played at the dispatcher and will sound like a garbled cacophony of voices.

Utilizing the present invention solves this problem. By reordering the data packets based upon the originator, the dispatcher will hear the entirety of the first respondent prior to hearing any other respondents. In accordance with the preferred embodiment of the present invention, the data packet sequencer will then re-sequence the data packets sent by the second respondent. In this manner, the data packet sequencer will receive a data stream with mixed data packets from multiple users, but will reorder the data packets based upon the originator. In this manner, the dispatcher or other recipient of the reordered data packets will be able to hear entire responses before hearing other responses to the same dispatch message.

The step of reordering the interleaved data packets preferably forms a plurality of sequenced data packets. Each sequenced data packet is preferably associated with the originator of the sequenced data packet. In the preferred embodiment of the present invention, a tone is inserted at the beginning of the first packet from a user. The tone is preferably associated with the originator and assists the mobile units in the dispatch group in identifying the originator of the dispatch response.

While this invention has been described in terms of certain examples thereof, it is not intended that it be limited to the above description, but rather only to the tent set forth in the claims that follow.

I claim:

1. A method for re-sequencing data packets in a packet-based digital communication system, the method comprising the steps of:

receiving a set of data packets, each data packet including an indicator of the originator of the data packet;

storing the set of data packets;

retrieving a first data packet of the set of data packets;

determining a first indicator of the originator of the first data, packet; and ordering for transmission all data packets in the set of data packets that were originated by the originator of the first data packet regardless of the order of the received set of data packets, the ordering being effective in putting the data packets originated by the originator of the first data packet sequentially and contiguously; and inserting a data packet that represents a tone retrieved from a tone table to the first data packet, wherein the tone is associated with the originator.

2. A method for re-sequencing data packets in accordance with claim 1, the method further comprising the steps of, prior to sequentially ordering for transmission all data packets:

retrieving each of the stored data packets; and determining the originator of each of the stored data packets.

3. A method for re-sequencing data packets in accordance with claim 1, the method further comprising the steps of:

determining a second indicator of a second originator distinct from the originator of the first data packet; and sequentially ordering for transmission all data packets that were originated by the second originator.

4. A method for re-sequencing data packets in accordance with claim 1, wherein the step of inserting a data packet that represents a tone to the first data packet comprises inserting a default packet that represents a tone to the first data packet.

5. A method for re-sequencing data packets in accordance with claim 1, further comprising the step of starting a timer upon retrieving the first data packet.

6. A method for re-sequencing data packets in accordance with claim 5, further comprising the step of ordering for transmission all packets sent from a second user upon expiration of the timer.

7. A method for re-sequencing data packets in accordance with claim 6, wherein ordering for transmission all packets sent from a second user upon expiration of the timer comprises the steps of:

retrieving the next data packet;

determining a second originator of the next data packet; and sequentially ordering for transmission all data packets in the set of data packets that were originated by the second originator regardless of the order of the received set of data packets.

8. A method for re-sequencing data packets in accordance with claim 1, the method further comprising the step of determining a last packet originated by the originator of the first data packet.

9. A method for re-sequencing data packets in accordance with claim 8, wherein the step of determining a last packet originated by the originator of the first data packet comprises detecting an end of transmission packet within the set of data packets.

10. A method for re-sequencing data packets in accordance with claim 1, the method further comprising the step of transmitting an indication that the received data packets are being stored.

11. A method for re-sequencing data packets in accordance with claim 1, the method further comprising the steps of:

determining whether an output session is in progress;

establishing an output session if no output session is in progress;

determining a tone to use for the originator of the first data packet; and transmitting a voice packet for the originator of the first data packet with the tone.

12. A data packet sequencer comprising:

a packet input module that is effective in receiving a set of data packets including a first data packet and a plurality of secondary data packets;

an input buffer that is effective in storing the set of data packets;

a tone table, a control module that is effective in identifying an originator of each of the set of data the first data packet and each of the plurality of secondary data packets and sequentially ordering for transmission all data packets in the set of data packets that were originated by the originator of the first data packet regardless of the order of the received set of data packets, wherein the control module checks the tone table to determine whether the originator has an associated tone; and a packet output module that is effective in sending all data packets that were sent by the originator of the first data packet.

13. A data packet sequencer in accordance with claim 12, wherein the control module is effective in determining whether an output session is in progress.

14. A data packet sequencer in accordance with claim 13, wherein the control module establishes an output session if an output session is not in progress.

15. A data packet sequencer in accordance with claim 12, wherein the control module uses the associated tone if the control module determines that the originator has an associated tone.

16. A data packet sequencer in accordance with claim 15, wherein the control module is effective in inserting a packet that represents the associated tone to an output data packet.

17. A data packet sequencer in accordance with claim 12, wherein the control module forms a default tone packet associated with a default tone if the control module determines that the originator does not have an associated tone.

18. A data packet sequencer in accordance with claim 17, wherein the control module is effective in inserting the default tone packet to an output data packet.

19. A data packet sequencer in accordance with claim 12, wherein the first data packet and each of the plurality of secondary data packets includes a packet header, and wherein the control module is effective in identifying the originator by the packet header.

* * * * *